US009482210B2

(12) United States Patent
Harada et al.

(10) Patent No.: US 9,482,210 B2
(45) Date of Patent: Nov. 1, 2016

(54) SOLAR THERMAL POWER GENERATION FACILITY AND METHOD OF STARTING UP SAME

(71) Applicant: MITSUBISHI HEAVY INDUSTRIES, LTD., Minato-ku, Tokyo (JP)

(72) Inventors: Shoichi Harada, Tokyo (JP); Kazuya Higashi, Tokyo (JP); Takashi Sonoda, Tokyo (JP); Keisuke Yamamoto, Tokyo (JP); Yoshifumi Iwasaki, Tokyo (JP); Tatsuya Iwasaki, Tokyo (JP); Sumio Toyofuku, Tokyo (JP); Kazuma Nishizawa, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 218 days.

(21) Appl. No.: 14/372,405

(22) PCT Filed: Mar. 18, 2013

(86) PCT No.: PCT/JP2013/057650
§ 371 (c)(1),
(2) Date: Jul. 15, 2014

(87) PCT Pub. No.: WO2013/141201
PCT Pub. Date: Sep. 26, 2013

(65) Prior Publication Data
US 2014/0360188 A1  Dec. 11, 2014

(30) Foreign Application Priority Data

Mar. 22, 2012 (JP) ................................ 2012-066363

(51) Int. Cl.
*F03G 6/04* (2006.01)
*F02C 7/275* (2006.01)
*F02C 1/05* (2006.01)

(52) U.S. Cl.
CPC ............... *F03G 6/045* (2013.01); *F02C 1/05* (2013.01); *F02C 7/275* (2013.01); *F05D 2260/606* (2013.01); *Y02E 10/465* (2013.01)

(58) Field of Classification Search
CPC .......... F03G 6/045; F02C 7/275; F02C 1/05; Y02E 10/465; F05D 2260/606
USPC ........................... 60/641.8–641.15, 646, 657
See application file for complete search history.

(56) References Cited

U.S. PATENT DOCUMENTS 4,761,957 A * 8/1988 Eberhardt ................. F02C 1/04
60/650

(Continued)

FOREIGN PATENT DOCUMENTS

JP        S62-017951 B    4/1987
JP        H10-008996 A    1/1998

(Continued)

OTHER PUBLICATIONS

PCT, "International Search Report for PCT/JP2013/057650," Apr. 23, 2013.
PCT, "Written Opinion for PCT/JP2013/057650," Apr. 23, 2013.

*Primary Examiner* — Hoang Nguyen
(74) *Attorney, Agent, or Firm* — Manabu Kanesaka; Benjamin Hauptman; Kenneth M. Berner (57) ABSTRACT

A solar thermal power generation facility is provided with turbine bypass piping (74) which makes some of compressed air from a compressor (10) bypass a turbine (20), a turbine bypass valve (75) which adjusts the flow rate of the compressed air flowing through the turbine bypass piping (74), and a control device (80) which controls the rotational torque of a turbine rotor (21) by opening the turbine bypass valve (75) before a rotor rotational speed reaches a rated rotational speed in a speeding-up process of the rotor rotational speed by a start-up device (60) and adjusting the flow rate of the compressed air that is made to bypass, by the turbine bypass valve (75). The control device (80) instantaneously fully closes the turbine bypass valve (75) at the time of incorporation in which a power generator (50) is connected to an electric power system (S).

13 Claims, 5 Drawing Sheets

(56) References Cited

U.S. PATENT DOCUMENTS

| | | | | |
|---|---|---|---|---|
| 4,834,622 A * | 5/1989 | Schuh | ............... | F02C 3/085 415/27 |
| 8,869,531 B2 * | 10/2014 | Held | ............... | F01K 3/185 60/651 |
| 8,966,901 B2 * | 3/2015 | Held | ............... | F01K 3/185 60/645 |
| 2011/0259007 A1 | 10/2011 | Aoyama et al. | | |
| 2014/0033708 A1 * | 2/2014 | Groppel | ............... | F22B 1/006 60/641.8 |

FOREIGN PATENT DOCUMENTS

| | | |
|---|---|---|
| JP | 2991580 B | 12/1999 |
| JP | 2004-044410 A | 2/2004 |
| JP | 2004-282948 A | 10/2004 |
| JP | 2006-283563 A | 10/2006 |
| JP | 2010-275996 A | 12/2010 |
| JP | 2011-32901 A | 2/2011 |
| WO | 2010-140565 A1 | 12/2010 |

* cited by examiner

SOLAR THERMAL POWER GENERATION FACILITY AND METHOD OF STARTING UP SAME

RELATED APPLICATIONS

The present application is National Phase of International Application No. PCT/JP2013/057650 filed Mar. 18, 2013, and claims priority from Japanese Application No. 2012-066363, filed Mar. 22, 2012.

TECHNICAL FIELD

The present invention relates to a solar thermal power generation facility which is provided with a compressor which compresses a working medium, thereby producing a compressed medium, a heat receiver which receives sunlight, thereby heating the compressed medium, a turbine which is driven by the compressed medium heated in the heat receiver, and a power generator which generates electricity by the driving of the turbine, and a method of starting up the solar thermal power generation facility. This application claims the right of priority based on Japanese Patent Application No. 2012-066363 filed with the Japan Patent Office on Mar. 22, 2012, the contents of which are incorporated herein by reference.

BACKGROUND ART

In recent years, facilities using thermal energy which is obtained by condensing sunlight, as environmentally-friendly clean energy, have been developed actively.

As an example of such facilities, there is a solar thermal power generation facility described in, for example, PTL 1 below. The solar thermal power generation facility is provided with a compressor which compresses air as a working medium, thereby producing compressed air, a heat receiver which receives sunlight, thereby heating the compressed air, a collector (a heliostat) which irradiates the sunlight to the heat receiver, a turbine which is driven by the compressed air heated in the heat receiver, and a power generator which generates electricity by the driving of the turbine.

The solar thermal power generation facility is further provided with turbine bypass piping which is branched from heated air piping that sends the compressed air heated in the heat receiver to the turbine and connected to a chimney, and a turbine bypass valve which adjusts the flow rate of the compressed air flowing through the turbine bypass piping.

In the solar thermal power generation facility, turbine output is adjusted by a change in the number of collectors which irradiate the sunlight to the heat receiver and a change in a valve opening degree of the turbine bypass valve.

Incidentally, as a gas turbine power generation facility, a configuration is common which is provided with a compressor which compresses air, a combustor which mixes fuel into the compressed air from the compressor and burns the mixture, thereby producing combustion gas, a turbine which is driven by the combustion gas, and a power generator which generates electricity by the driving of the turbine. In the gas turbine power generation facility, at the time of start-up, a rotor rotational speed of the turbine is increased by driving an electric motor, for example. At this time, the rotational torque of the turbine rotor is controlled by adjusting the flow rate of the fuel which is supplied to the combustor.

CITATION LIST

Patent Literature

[PTL 1] Japanese Unexamined Patent Application Publication No. 2010-275996

SUMMARY OF INVENTION

Technical Problem

In the general gas turbine power generation facility described above, a start-up method is basically established. However, in the solar thermal power generation facility described in PTL 1, a start-up method thereof or a synchronization adjustment method at the time of incorporation of a load is not yet established.

For example, in the solar thermal power generation facility, at the time of start-up, a method of following the start-up method of the general gas turbine power generation facility described above may be considered. In this case, a method to control the rotational torque of the rotor by changing thermal energy input to the heat receiver which is an air heating place, that is, the number of collectors irradiating the sunlight to the heat receiver, while speeding up the rotational speed of the turbine rotor by an electric motor may be considered.

However, in this method, the intensity of the sunlight depends on the weather, and thus in a change in the number of collectors which irradiate the sunlight to the heat receiver, it is expected that the rotational torque control of the turbine rotor at the time of start-up would be very difficult. Further, in this method, since the heat capacity of the heat receiver is large, even if the number of collectors which irradiate the sunlight to the heat receiver is changed, several minutes are required before a change in the number of collectors which irradiate the sunlight to the heat receiver is reflected in a change in the rotational torque of the turbine rotor, and thus responsiveness is poor. That is, this method is considered not to be very suitable for fine rotational torque control of the turbine rotor at the time of start-up.

The present invention has an object to provide a solar thermal power generation facility in which it is possible to suitably control the rotational torque of a turbine rotor at the time of start-up, and a method of starting up the solar thermal power generation facility.

Solution to Problem

According to a first aspect of the present invention, there is provided a solar thermal power generation facility including: a compressor which compresses a working medium, thereby producing a compressed medium; a heat receiver which receives sunlight, thereby heating the compressed medium; a turbine in which a turbine rotor is rotated by the compressed medium heated in the heat receiver; a power generator which generates electricity by rotation of the turbine rotor; a start-up device which rotates the turbine rotor at the time of start-up; bypass means for making at least a portion of the compressed medium from the compressor bypass the turbine or the heat receiver; and a control device which controls rotational torque of the turbine rotor by making the compressed medium bypass by the bypass means before a rotor rotational speed reaches a rated rotational speed in a speeding-up process of the rotor rotational speed by the start-up device and adjusting a flow rate of the compressed medium which is made to bypass.

If the compressed medium is made to bypass by the bypass means before the rotor rotational speed reaches the rated rotational speed in the speeding-up process of the rotor rotational speed, the flow rate of the compressed medium flowing into the turbine can be adjusted by adjusting the flow rate of the compressed medium which is made to bypass. For this reason, it is possible to control the rotational torque of the turbine rotor after the rotor rotational speed reaches the rated rotational speed and before the time of the incorporation of the power generator. In this manner, in a method of controlling the rotational torque by adjusting the flow rate of the compressed medium which is made to bypass, since the flow rate of the compressed medium which is sent to the turbine is changed, the influence of the weather is small. In addition, in this method, time until a change in the flow rate of the compressed medium which is made to bypass is reflected in a change in the rotational torque of the turbine rotor is very short. For this reason, by adjusting the flow rate of the compressed medium which is made to bypass, it is possible to suitably control the rotational torque of the turbine rotor at the time of start-up.

In the solar thermal power generation facility described above, the control device may instantaneously reduce the flow rate of the compressed medium which is made to bypass by the bypass means, at the time of incorporation in which the power generator is connected to an electric power system after the rotor rotational speed reaches the rated rotational speed.

In this case, the control device may make the flow rate of the compressed medium which is made to bypass by the bypass means be 0 at the time of the incorporation.

In a case where the bypass means has a bypass flow rate adjustment valve which adjusts the flow rate of the compressed medium which is made to bypass, the control device may make a valve opening degree of the bypass flow rate adjustment valve be fully closed at the time of the incorporation.

If the power generator is incorporated into the electric power system, load is rapidly applied to the power generator, whereby the rotational speed of the turbine rotor is rapidly reduced. Therefore, in the solar thermal power generation facility described above, a configuration is made such that at the same time as the incorporation of the power generator, the flow rate of the compressed medium which is made to bypass by the bypass means is instantaneously reduced, whereby the compressed medium not sent to the turbine, of the compressed medium sent from the compressor, is sent to the turbine, and thus the rotational speed of the turbine rotor is maintained as the rated rotational speed.

In the solar thermal power generation facility described above, the control device may adjust the flow rate of the compressed medium which is made to bypass by the bypass means such that an actual rotor rotational speed approaches a predetermined rotor rotational speed pattern at the time of start-up until just before the incorporation.

In this case, the control device may stop assistance for rotation of the turbine rotor by the start-up device before the time of the incorporation.

In the solar thermal power generation facility described above, a rotational speed conversion mechanism which changes the rotational speed of the power generator by controlling electric power which is supplied to the power generator, in order to control the rotational speed of the turbine rotor, becomes unnecessary. For this reason, it is possible to reduce the manufacturing cost of the solar thermal power generation facility described above.

In the solar thermal power generation facility described above, the start-up device may have an electric motor which rotates the turbine rotor at the time of start-up, and a torque ratio conversion mechanism which changes the ratio of torque that is transmitted from an input shaft to an output shaft, the input shaft of the torque ratio conversion mechanism may be connected to an output shaft of the electric motor, the output shaft of the torque ratio conversion mechanism may be connected to the turbine rotor, and the control device may output a control command corresponding to a target value of the torque ratio according to the lapse of time to the torque ratio conversion mechanism at the time of start-up, thereby increasing rotational torque which is transmitted from the start-up device to the turbine rotor, and thus speeding up the rotor rotational speed.

In the solar thermal power generation facility described above, the start-up device may have the power generator which functions as an electric motor that rotates the turbine rotor at the time of start-up, and a rotational speed conversion mechanism which changes a rotational speed of the power generator by controlling electric power that is supplied to the power generator, and the control device may output a control command according to a target value of the rotational speed of the power generator according to the lapse of time to the rotational speed conversion mechanism at the time of start-up, thereby speeding up the rotor rotational speed by the start-up device.

In the solar thermal power generation facility described above, the bypass means may make the compressed medium bypass on the further upstream side with respect to the heat receiver.

In the solar thermal power generation facility described above, since a high-temperature compressed medium heated in the heat receiver does not flow through the bypass means, bypass means for a high temperature, for example, a pipe or a valve for a high temperature becomes unnecessary, and thus it is possible to reduce the manufacturing cost of the bypass means.

In the solar thermal power generation facility described above, the bypass means may have turbine bypass piping which leads at least a portion of the compressed medium compressed in the compressor from the further upstream side with respect to the turbine to an exhaust side of the turbine, and a turbine bypass valve which adjusts the flow rate of the compressed medium flowing through the turbine bypass piping, and the control device may adjust a valve opening degree of the turbine bypass valve.

In the solar thermal power generation facility described above, the bypass means may have heat receiver bypass piping which makes at least a portion of the compressed medium compressed in the compressor bypass the heat receiver from the further upstream side with respect to the heat receiver, thereby leading the compressed medium to the further downstream side with respect to the heat receiver and to the further upstream side with respect to the turbine, and a heat receiver bypass valve which adjusts the flow rate of the compressed medium flowing through the heat receiver bypass piping, and the control device may adjust a valve opening degree of the heat receiver bypass valve.

In the solar thermal power generation facility described above, the bypass means may have blow-off piping which releases at least a portion of the compressed medium compressed in the compressor from the further upstream side with respect to the heat receiver to the atmosphere, and a blow-off valve which adjusts the flow rate of the compressed medium flowing out from the blow-off piping to the atmosphere, and the control device may adjust a valve opening degree of the blow-off valve.

According to a second aspect of the present invention, there is provided a method of starting up a solar thermal power generation facility that includes a compressor which compresses a working medium, thereby producing a compressed medium, a heat receiver which receives sunlight, thereby heating the compressed medium, a turbine in which a turbine rotor is rotated by the compressed medium heated in the heat receiver, a power generator which generates electricity by rotation of the turbine rotor, and a start-up device which rotates the turbine rotor at the time of start-up, the method including: a speeding-up process of speeding up a rotational speed of the turbine rotor in the start-up device; and an incorporation procedure control process of controlling rotational torque of the turbine rotor until the time of incorporation in which the power generator is connected to an electric power system, by making at least a portion of the compressed medium from the compressor bypass the turbine or the heat receiver before the rotational speed of the turbine rotor reaches a rated rotational speed in the speeding-up process and adjusting a flow rate of the compressed medium which is made to bypass.

If the compressed medium is made to bypass before the rotor rotational speed reaches the rated rotational speed in the speeding-up process of the rotor rotational speed, the flow rate of the compressed medium flowing into the turbine can be adjusted by adjusting the flow rate of the compressed medium which is made to bypass. For this reason, it is possible to control the rotational torque of the turbine rotor after the rotor rotational speed reaches the rated rotational speed and before the time of the incorporation of the power generator. In this manner, in a method of controlling the rotational torque by adjusting the flow rate of the compressed medium which is made to bypass, since the flow rate of the compressed medium which is sent to the turbine is changed, the influence of the weather is small. In addition, in this method, time until a change in the flow rate of the compressed medium which is made to bypass is reflected in a change in the rotational torque of the turbine rotor is very short. For this reason, by adjusting the flow rate of the compressed medium which is made to bypass, it is possible to suitably control the rotational torque of the turbine rotor at the time of start-up.

In the method of starting up a solar thermal power generation facility described above, in the incorporation procedure control process, the flow rate of the compressed medium which is made to bypass may be instantaneously reduced at the time of the incorporation.

In this case, in the incorporation procedure control process, the flow rate of the compressed medium which is made to bypass may be made to be 0 at the time of the incorporation.

If the power generator is incorporated into the electric power system, load is rapidly applied to the power generator, whereby the rotational speed of the turbine rotor is rapidly reduced. Therefore, in the start-up method described above, a configuration is made such that at the same time as the incorporation of the power generator, the flow rate of the compressed medium which is made to bypass is instantaneously reduced, whereby the compressed medium not sent to the turbine, of the compressed medium sent from the compressor, is sent to the turbine, and thus the rotational speed of the turbine rotor is maintained as the rated rotational speed.

Advantageous Effects of Invention

According to the present invention, it is possible to suitably control the rotational torque of the turbine rotor at the time of start-up.

DESCRIPTION OF EMBODIMENTS

Hereinafter, an embodiment of a solar thermal power generation facility according to the present invention and modified examples thereof will be described in detail with reference to the drawings.

[Embodiment]

First, an embodiment of the solar thermal power generation facility will be described with reference to FIGS. 1 and 2.

Figure 1:
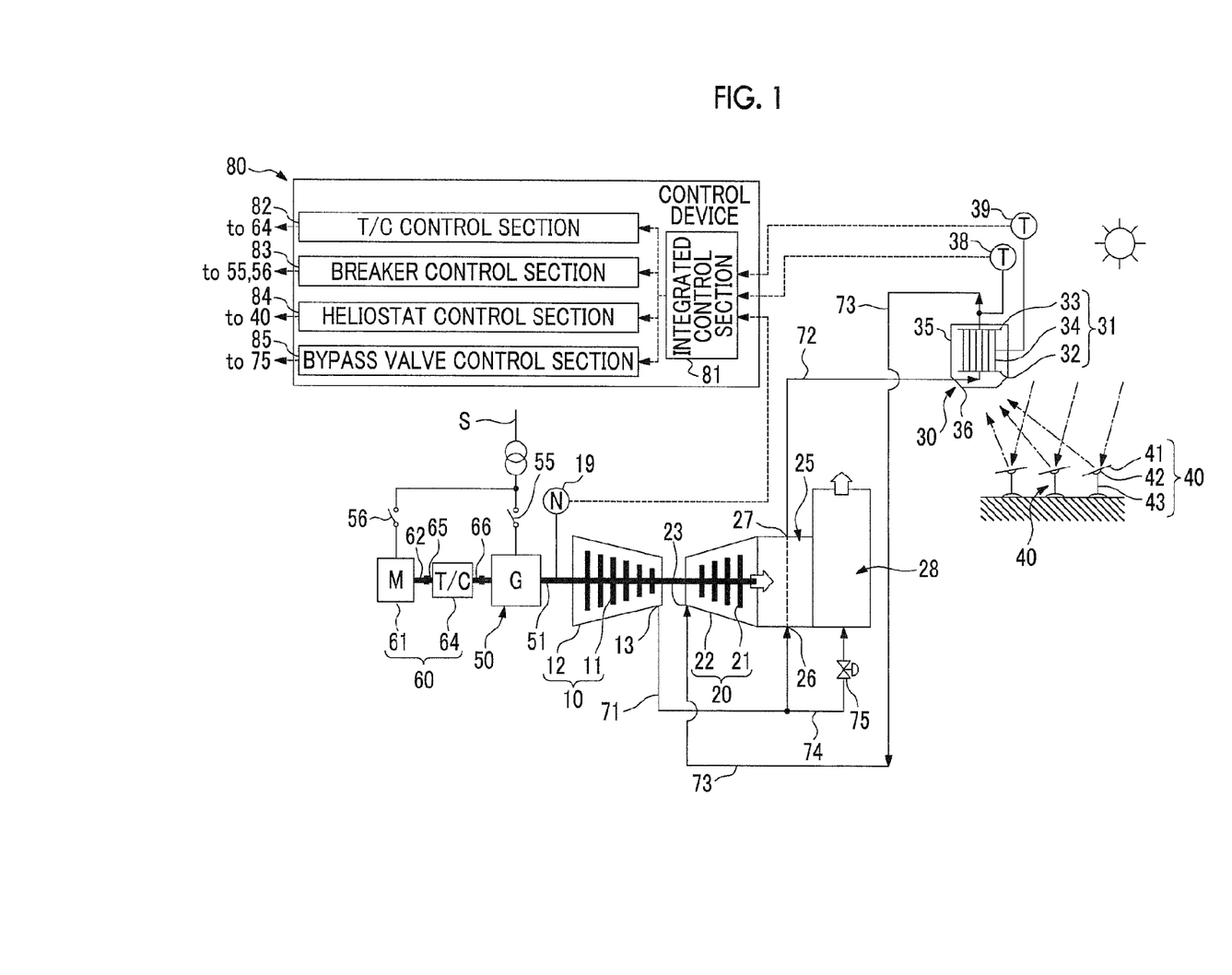
FIG. 1 is an explanatory diagram showing the configuration of a solar thermal power generation facility in an embodiment related to the present invention.
Figure 2:
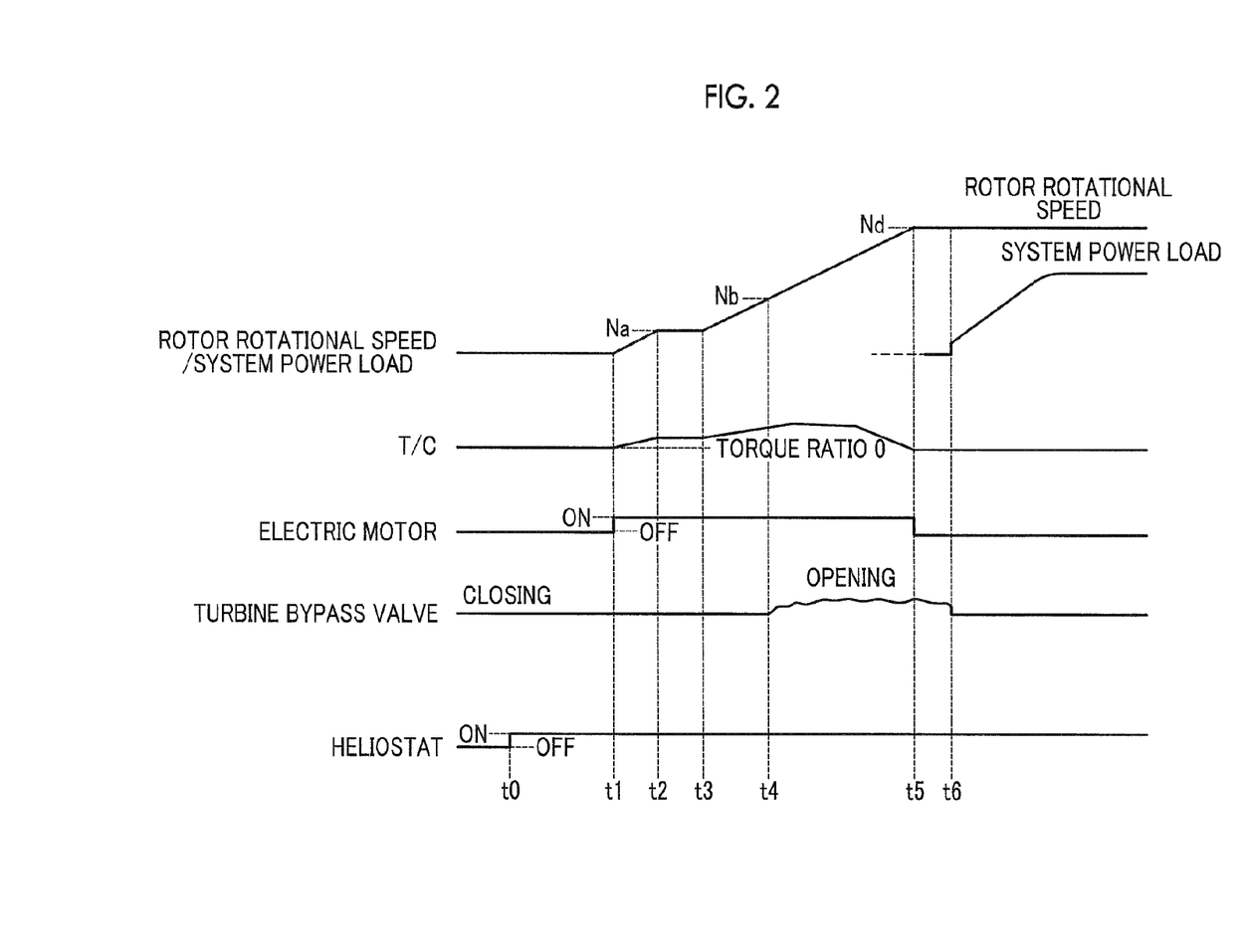
FIG. 2 is a time chart showing an operation of the solar thermal power generation facility in the embodiment related to the present invention.

The solar thermal power generation facility of this embodiment is provided with a compressor 10 which compresses air as a working medium, thereby producing compressed air that is a compressed medium, a heat receiver 30 which receives sunlight, thereby heating the compressed air, a plurality of heliostats 40 which irradiate the sunlight to the heat receiver 30, a turbine 20 which is driven by the compressed air heated in the heat receiver 30, a power generator 50 which generates electricity by the driving of the turbine 20, a start-up device 60 which rotates a compressor rotor 11 and a turbine rotor 21 at the time of start-up, and a control device 80 which controls these components, as shown in FIG. 1.

The heat receiver 30 has a heat receiving section 31 to which the sunlight is irradiated, and a casing 35 which covers the heat receiving section 31. The heat receiving section 31 has lower header piping 32, upper header piping disposed above the lower header piping 32, and a plurality of heat receiving tubes 34 which extend in a vertical direction and connect the lower header piping 32 and the upper header piping 33. An opening 36 for leading the sunlight from the heliostats 40 to the inside of the heat receiving section 31 is formed in a lower portion of the casing 35. The heat receiver 30 is provided on a tower (not shown) built in an installation area of the solar thermal power generation facility.

The heliostat 40 has a reflecting mirror 41 which reflects the sunlight, a support leg 43 which supports the reflecting mirror 41, and a drive controller 42 which turns the reflecting mirror 41 in a desired direction. The heliostats 40 are disposed around the tower on which the heat receiver 30 is provided.

The compressor 10 has the compressor rotor 11 which rotates, and a compressor casing 12 which rotatably covers the compressor rotor 11.

The turbine 20 has the turbine rotor 21 which rotates, and a turbine casing 22 which rotatably covers the turbine rotor 21. The turbine rotor 21 is located on an extension line of the compressor rotor 11 and connected to the compressor rotor 11. Further, the compressor rotor 11 is connected to a power generator rotor 51. Therefore, if the power generator rotor 51 rotates, the compressor rotor 11 and the turbine rotor 21 also rotate.

A reheater 25 which heats the compressed air from the compressor 10 by using exhaust air that is high-temperature compressed air exhausted from the turbine 20 is provided on the exhaust side of the turbine 20. In addition, an exhaust air duct 28 which exhausts the exhaust air after the compressed air is heated is provided in the reheater 25.

The start-up device 60 is provided with an electric motor 61 and a torque converter (a torque ratio conversion mechanism) 64 that changes the ratio of torque which is transmitted from an input shaft 65 to an output shaft 66. The electric motor 61 rotates the power generator rotor 51, the compressor rotor 11, and the turbine rotor 21 at the time of start-up. The torque converter 64 can change the ratio of the torque which is transmitted from the input shaft 65 to the output shaft 66 by changing an opening degree of a built-in guide vane (not shown). The input shaft 65 of the torque converter 64 is connected to an output shaft 62 of the electric motor 61, and the output shaft 66 of the torque converter 64 is connected to the power generator rotor 51. The power generator rotor 51 is connected to the compressor rotor 11, as described above, and the compressor rotor 11 is connected to the turbine rotor 21. For this reason, the output shaft 66 of the torque converter 64 is connected to the compressor rotor 11 through the power generator rotor 51 and also connected to the turbine rotor 21.

The power generator 50 is electrically connected to an electric power system S through a power generator breaker 55. Further, the electric motor 61 is electrically connected to the electric power system S through a start-up device breaker 56.

A discharge port 13 of the compressor 10 and a compressed air inlet 26 of the reheater 25 are connected by compressed air piping 71. A compressed air outlet 27 of the reheater 25 and the lower header piping 32 of the heat receiver 30 are connected by reheated air piping 72. The upper header piping 33 of the heat receiver 30 and an intake port 23 of the turbine 20 are connected by heated air piping 73. The compressed air piping 71 and the exhaust air duct 28 are connected by turbine bypass piping 74. In the turbine bypass piping 74, a turbine bypass valve 75 which adjusts the flow rate of the compressed air passing through the turbine bypass piping 74 is provided. In addition, in this embodiment, bypass means is configured by the turbine bypass piping 74 and the turbine bypass valve 75. Due to the turbine bypass piping 74 and the turbine bypass valve 75, inflow of a high-temperature working medium into the turbine 20 is limited when requiring an emergency stop, such as the time of a tripping of the turbine 20, and thus it becomes possible to safely attain turbine stopping.

A heat receiver outlet thermometer 38 which measures the temperature of the compressed air heated in the heat receiver 30 is provided in the heated air piping 73. Further, a heat receiving tube thermometer 39 which measures the temperature of the heat receiving tube 34 is provided in the heat receiving tube 34 of the heat receiver 30. In any one of the power generator rotor 51, the compressor rotor 11, and the turbine rotor 21, a rotational speed meter 19 which measures a rotor rotational speed that is the rotational speed of each of these rotors is provided. All the values measured by the heat receiver outlet thermometer 38, the heat receiving tube thermometer 39, and the rotational speed meter 19 are sent to the control device 80.

The control device 80 functionally has a torque converter control section 82, a breaker control section 83 which outputs an opening and closing command to each of the breakers 55 and 56, a heliostat control section 84 which outputs an ON or OFF command for sunlight irradiation to the heat receiver 30 for each of the plurality of heliostats 40, a bypass valve control section 85 which outputs a valve opening degree command to the turbine bypass valve 75, and an integrated control section 81. The torque converter control section 82 outputs a torque ratio command to the torque converter 64 at the time of start-up. The integrated control section 81 receives various types of data from the outside, thereby controlling the respective control sections 82 to 85 described above.

In addition, the control device 80 is a computer and is provided with a CPU which executes various calculations, a memory serving as a work area of the CPU, an external storage device in which a program that the CPU executes or various types of data are stored, and an input-output interface for various types of data. All the functional configurations of the control device 80 function by the CPU executing the programs stored in the external storage device.

Next, an operation at the time of start-up of the solar thermal power generation facility will be described according to a timing chart shown in FIG. 2.

In the solar thermal power generation facility, if the sun begins to rise in the morning, the heliostat control section 84 of the control device 80 outputs an irradiation ON command to the plurality of heliostats 40 (t0). The drive controllers 42 of the heliostats 40 having received the irradiation ON command adjust the directions of the reflecting mirrors 41 such that the sunlight reflected by the reflecting mirrors 41 is directed to the heat receiver 30.

If the heat receiving section 31 of the heat receiver 30 is irradiated with the sunlight, air in the heat receiving section 31 is heated along with the heat receiving section 31 and the temperatures of the air and the heat receiving section 31 gradually rise.

If the temperature measured by the heat receiver outlet thermometer 38 or the heat receiving tube thermometer 39 reaches a predetermined temperature (for example, a temperature in a range of 200° C. to 300° C.) (t1), the breaker control section 83 of the control device 80 outputs a closing command to the start-up device breaker in response to an instruction from the integrated control section 81. As a result, system power begins to be supplied to the electric motor 61, and thus the electric motor 61 begins to be driven. Further, at the same time, the torque converter control section 82 of the control device 80 outputs a start-up command to the torque converter 64 in response to an instruction from the integrated control section 81.

The torque converter control section 82 outputs a command related to a target torque ratio which is represented by, for example, a predetermined torque ratio pattern, to the torque converter 64. Specifically, the torque ratio pattern determines the target torque ratio at each time from the time of the start of start-up of the electric motor 61 such that an increasing rate per unit time of the rotor rotational speed from the time of the start of start-up of the electric motor 61 becomes a predetermined increasing rate. The torque converter control section 82 outputs, as a torque ratio command, the opening degree of the guide vane of the torque converter 64 to the guide vane such that the target torque ratio at that time is obtained, according to the torque ratio pattern. In addition, here, the magnitude of output torque to input torque becomes larger as the opening degree of the guide vane becomes larger. Therefore, here, the opening degree of the guide vane gradually increases with time. As a result, the torque which is transmitted from the input shaft 65 to the output shaft 66 of the torque converter 64 gradually increases with time, and thus the rotational speed of the power generator rotor 51 and the rotor rotational speeds of the compressor 10 and the turbine 20 gradually increase with time.

If the compressor rotor 11 begins to rotate, air is suctioned, and thus compressed air is produced, and the compressed air is discharged from the discharge port 13 of the compressor casing 12. The compressed air is sent to the heat receiving section 31 of the heat receiver 30 by way of the compressed air piping 71, the reheater 25, and the reheated air piping 72 and heated in the heat receiving section 31.

The compressed air heated in the heat receiver 30 is sent to the turbine 20 by way of the heated air piping 73 and rotates the turbine rotor 21. The compressed air having rotated the turbine rotor 21 is exhausted from the exhaust air duct 28 to the atmosphere by way of the reheater 25 as exhaust air. In this procedure, the compressed air is heated by heat exchange between the exhaust air and the compressed air having come through the compressed air piping 71, in the reheater 25.

Here, if the rotor rotational speed reaches a predetermined rotational speed Na (for example, a rotational speed in a range of 20% to 40% of a rated rotational speed Nd) (t2), the torque ratio is fixed by temporarily stopping the torque ratio control of the torque converter 64 by the torque converter control section 82. At this time, waiting may be performed until the temperature measured by the heat receiver outlet thermometer 38 or the heat receiving tube thermometer 39 reaches a predetermined temperature (for example, a temperature in a range of 500° C. to 700° C.). Then, if the temperature measured by the heat receiver outlet thermometer 38 or the heat receiving tube thermometer 39 reaches the predetermined temperature (t3), the torque ratio control of the torque converter 64 by the torque converter control section 82 may be executed again. With this method, it is possible to make torque required for turbine start-up small and constant.

Since the light quantity of the sunlight increases as the sun rises, even if the number of heliostats 40 irradiating the sunlight to the heat receiver 30 is constant, the quantity of light, in other words, the quantity of heat that the heat receiving section 31 of the heat receiver 30 receives increases. For this reason, a heating amount per unit time to the compressed air sent to the heat receiving section 31 also increases, and thus rotational torque to rotate the turbine rotor 21 by the compressed air increases. On the other hand, rotational torque to rotate the turbine rotor 21 by the electric motor 61 decreases relatively.

If the rotor rotational speed gradually increases, whereby the rotor rotational speed measured by the rotational speed meter 19 becomes greater than or equal to a predetermined rotational speed Nb (for example, a rotational speed in a range of 40% to 60% of the rated rotational speed Nd) (t4), the bypass valve control section 85 of the control device 80 outputs a valve opening degree command to the turbine bypass valve 75 in response to an instruction from the integrated control section 81. As a result, the turbine bypass valve 75 is opened, thereby reaching the instructed valve opening degree. As described above, since the heating amount to the compressed air in the heat receiver 30 increases with time and a force to rotate the turbine rotor 21 by the compressed air increases, the turbine bypass valve 75 is opened, whereby the flow rate of the heated compressed air which is sent to the turbine 20 is reduced.

At this time, the bypass valve control section 85 determines the valve opening degree of the turbine bypass valve 75 such that the rotor rotational speed measured by the rotational speed meter 19 approaches a predetermined rotational speed pattern. Specifically, the rotational speed pattern determines the rotor rotational speed at each time from the time of the start of start-up of the electric motor 61 such that an increasing rate per unit time of the rotor rotational speed becomes a predetermined increasing rate until the turbine rotor 21 reaches the rated rotational speed Nd from the time of the start of start-up of the electric motor 61. In addition, if the rotational speed pattern reaches the rated rotational speed Nd, then, the rotational speed pattern is constant at the rated rotational speed Nd. The bypass valve control section 85 determines the valve opening degree of the turbine bypass valve 75 according to, for example, a deviation between the rotor rotational speed measured by the rotational speed meter 19 and a target rotational speed when determining the rotational speed pattern. If the turbine bypass valve 75 is opened, whereby the flow rate of the heated compressed air which is sent to the turbine 20 changes, the rotational torque to rotate the turbine rotor 21 changes, whereby the rotor rotational speed changes. That is, the rotor rotational speed is controlled by controlling the rotational torque to rotate the turbine rotor 21 by adjusting the valve opening degree of the turbine bypass valve 75.

Incidentally, the rotational torque to rotate the turbine rotor 21 can also be controlled by a method of changing the number of heliostats 40 which irradiate the sunlight to the heat receiver 30. However, as described above, in this method, since the intensity of the sunlight depends on the weather, in a change in the number of heliostats 40 which irradiate the sunlight to the heat receiver 30, it is expected that the control of the rotational torque at the time of start-up would be very difficult. Further, in this method, since the heat capacity of the heat receiver 30 is large, even if the number of heliostats 40 which irradiate the sunlight to the heat receiver 30 is changed, it takes several minutes until a change in the number of heliostats 40 which irradiate the sunlight to the heat receiver 30 is reflected in a change in rotational torque, and thus the method is considered not to be very suitable for fine rotational torque control at the time of start-up.

On the other hand, in a method of controlling rotational torque by adjusting the valve opening degree of the turbine bypass valve 75, since the flow rate of the compressed air which is sent to the turbine 20 is changed, the influence of the weather is small. In addition, in this method, time until a change in the valve opening degree of the turbine bypass valve 75 is reflected in a change in the rotational torque of the turbine rotor 21 is very short. For this reason, by adjusting the valve opening degree of the turbine bypass valve 75, it is possible to suitably control the rotational torque of the turbine rotor 21 at the time of start-up.

The torque ratio pattern after the turbine bypass valve 75 is opened is gradually reduced, for example, and reaches 0 at the time when the rotational speed pattern reaches the rated rotational speed Nd. That is, the torque which is transmitted from the electric motor 61 to the power generator rotor 51 becomes 0. For this reason, the torque ratio of the torque converter 64 changes according to the torque ratio pattern, and if the rotor rotational speed approximately reaches the rated rotational speed Nd (t5), the torque ratio of the torque converter 64 becomes 0. If the torque ratio of the torque converter 64 becomes 0, the breaker control section 83 outputs an opening command to the start-up device breaker 56 and cuts off the power supply from the electric power system S to the electric motor 61, thereby stopping the electric motor 61.

The torque component to rotate the turbine rotor 21 by the heated compressed air, among the torque components to rotate the turbine rotor 21, increases relative to the torque component to rotate the turbine rotor 21 by the electric motor 61, with time. For this reason, in the control of the rotor rotational speed, the control by the valve opening degree of the turbine bypass valve 75 becomes more dominant with time. Then, after the electric motor 61 is stopped (t5), that is, if the compressor rotor and the turbine rotor 21 can maintain the rated rotational speed Nd without the aid of the electric motor 61, the rotor rotational speed is basically controlled by the valve opening degree of the turbine bypass valve 75.

In addition, with respect to the torque ratio pattern and the rotational speed pattern, although a change in the torque ratio or the rotational speed with time is basically fixed, in a case where the sunlight is blocked by clouds over a long period of time, whereby the temperature measured by the heat receiver outlet thermometer 38 or the like falls below a lower limit temperature, a time schedule of each pattern is stopped, for example, after the temperature measured by the heat receiver outlet thermometer 38 or the like falls below the lower limit temperature and until the temperature measured by the heat receiver outlet thermometer 38 or the like becomes higher than or equal to the lower limit temperature again.

If a predetermined time elapses (t6) after the rotor rotational speed approximately reaches the rated rotational speed Nd (t5), the breaker control section 83 outputs a closing command to the power generator breaker in response to an instruction from the integrated control section 81, thereby electrically connecting the electric power system S and the power generator 50. That is, the power generator 50 is incorporated into the electric power system S. At the same time, the bypass valve control section 85 applies a command of a valve opening degree of 0, that is, full closing, to the turbine bypass valve 75 in response to an instruction from the integrated control section 81.

If the power generator 50 is incorporated into the electric power system S, load is rapidly applied to the power generator 50, whereby the rotational speed of the power generator rotor 51 or the turbine rotor 21 is rapidly reduced. Here, a configuration is made such that at the same time as the incorporation of the power generator 50, the turbine bypass valve 75 is instantaneously fully closed, whereby the compressed air exhausted from the exhaust air duct 28 by way of the turbine bypass piping 74 without being sent to the turbine 20, of the compressed air sent from the compressor 10, is sent to the turbine 20, and thus the rotational speed of the power generator rotor 51 or the turbine rotor 21 is maintained as the rated rotational speed Nd.

Thereafter, the turbine 20 is basically controlled by adjusting the number of heliostats 40 which irradiate the sunlight to the heat receiver 30. In addition, the adjustment of the number of heliostats 40 is executed by the heliostat control section 84. However, for example, in a case where the load of the electric power system S rapidly changes or a case where the temperature measured by the heat receiver outlet thermometer 38 or the heat receiving tube thermometer 39 exceeds the respective upper limits, dealing with these cases is performed by adjusting the valve opening degree of the turbine bypass valve 75.

In addition, in this embodiment, the period in which the electric motor 61 is driven, that is, the period (from t1 to t5) in which the rotations of the compressor rotor 11 and the turbine rotor 21 are assisted by the electric motor 61 corresponds to a speeding-up process in the solar thermal power generation facility of this embodiment. Further, in this embodiment, the period (from t4 to t6) after the turbine bypass valve 75 begins to be opened and before the turbine bypass valve 75 is fully closed corresponds to an incorporation procedure control process in the solar thermal power generation facility of this embodiment.

As described above, in this embodiment, it is possible to suitably control the rotational torque of the turbine rotor 21 at the time of start-up, and as a result, it is possible to suitably control the rotor rotational speed at the time of start-up.

[First Modified Example]

Next, a first modified example of the embodiment of the solar thermal power generation facility described above will be described using FIG. 3.

Figure 3:
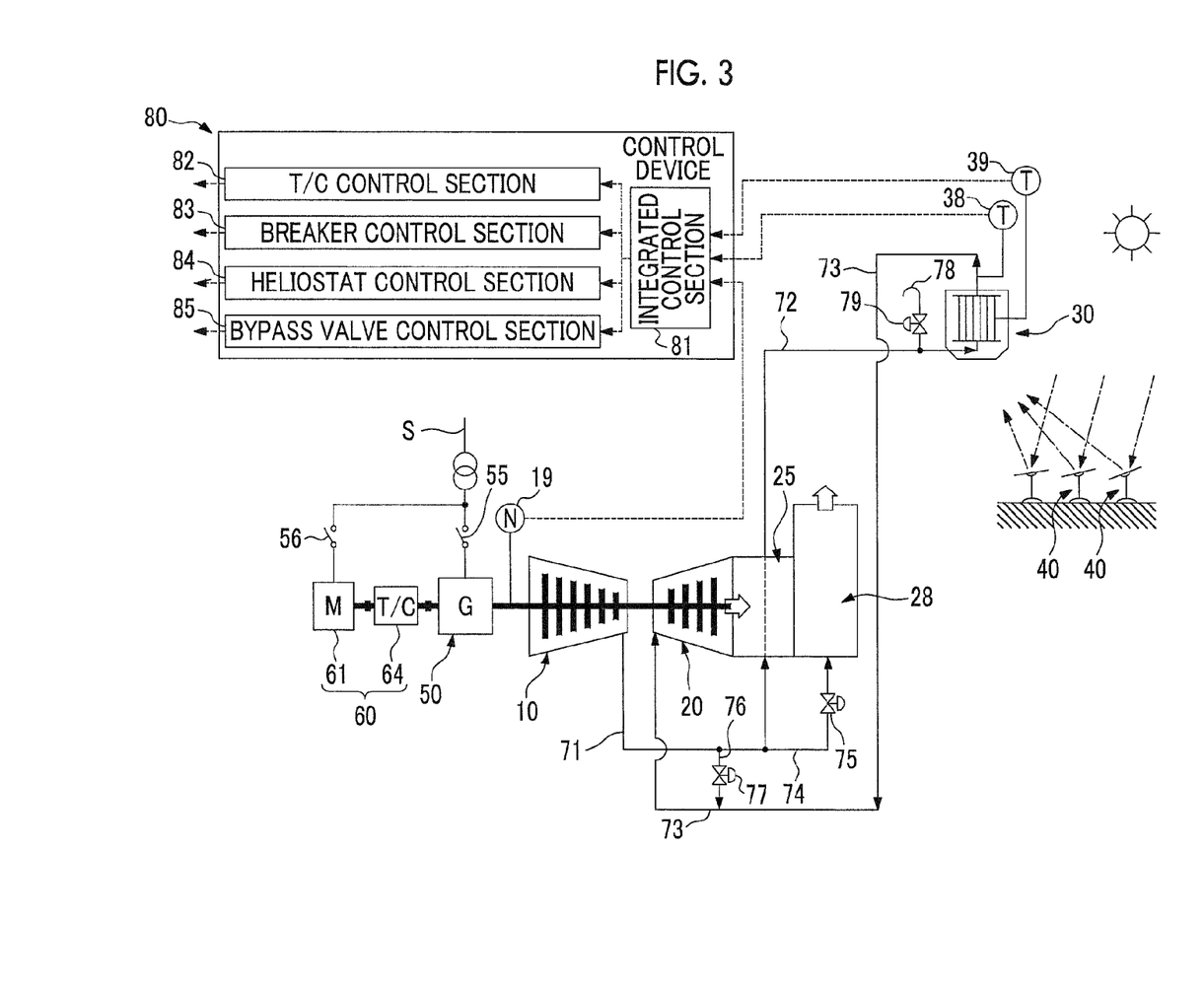
FIG. 3 is an explanatory diagram showing the configuration of a solar thermal power generation facility in a first modified example of the embodiment related to the present invention.

In the embodiment described above, the rotational torque of the turbine rotor 21 at the time of start-up is controlled by the valve opening degree of the turbine bypass valve 75. However, in the modified example which is described below, the rotational torque at the time of start-up is controlled by the valve opening degree of another valve.

For example, heat receiver bypass piping 76 connecting the compressed air piping 71 and the heated air piping 73 is provided and a heat receiver bypass valve 77 is provided in the heat receiver bypass piping 76. Then, the rotor rotational speed at the time of start-up may be controlled by controlling the rotational torque of the turbine rotor 21 by adjusting the valve opening degree of the heat receiver bypass valve 77, similar to the valve opening degree of the turbine bypass valve 75.

Further, blow-off piping 78 which releases the compressed air passing through the reheated air piping 72 to the atmosphere is provided at the reheated air piping 72 and a blow-off valve 79 is provided in the blow-off piping 78. Then, the rotational torque of the turbine rotor 21 may be controlled by adjusting the opening degree of the blow-off valve 79, similar to the valve opening degree of the turbine bypass valve 75.

As described above, if means for making some of the compressed air from the compressor 10 bypass the turbine 20 or the heat receiver 30 is provided and the rotational torque of the turbine rotor 21 at the time of start-up is controlled by adjusting the flow rate of the compressed air which is made to bypass by the means, it is possible to suitably control the rotational torque of the turbine rotor 21 at the time of start-up in any way.

However, in a case of making some of the compressed air after being heated in the heat receiver 30 bypass the turbine 20, since the temperature of the compressed air is very high, a valve which adjusts the flow rate of the compressed air which is made to bypass becomes very expensive. For example, in a case where turbine bypass piping connecting the heated air piping 73 and the exhaust air duct 28 is provided and a turbine bypass valve is provided in the turbine bypass piping, the turbine bypass valve becomes very expensive. For this reason, it is preferable that a method of making some of the compressed air after being heated in the heat receiver 30 bypass the turbine 20 be avoided.

Further, the means for making the compressed air bypass the turbine 20 or the heat receiver 30 need not be one or may be configured to be a plurality. In this case, the rotational torque of the turbine rotor 21 at the time of start-up may be controlled by using a plurality of pieces of means together.

[Second Modified Example]

Next, a second modified example of the embodiment of the solar thermal power generation facility described above will be described using FIGS. 4 and 5.

Figure 4:
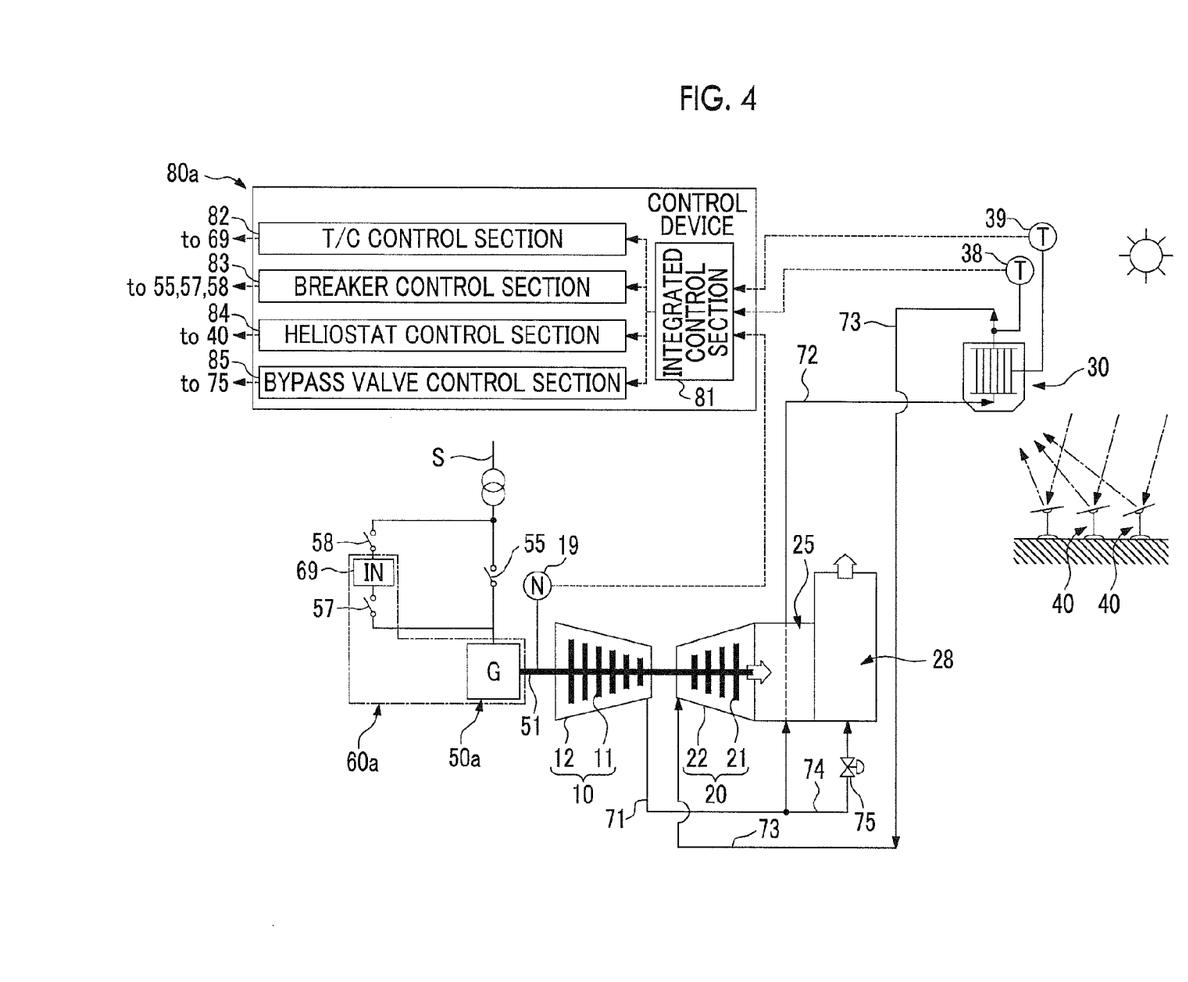
FIG. 4 is an explanatory diagram showing the configuration of a solar thermal power generation facility in a second modified example of the embodiment related to the present invention.

This modified example is configured by changing the start-up device 60 in the embodiment described above.

A start-up device 60a of this modified example is provided with a power generator 50a also functioning as an electric motor, and an inverter (a rotational speed conversion mechanism) 69 controlling the rotational speed of the power generator 50a, as shown in FIG. 4.

The power generator 50a also functioning as an electric motor is electrically connected to the electric power system S through the power generator breaker 55, similar to the embodiment described above. The power generator 50a is further electrically connected to the inverter 69 through an output-side breaker 57. The inverter 69 is electrically connected to the electric power system S through an input-side breaker 58.

In this manner, since the start-up device 60a of this modified example is provided with the inverter 69 controlling the rotational speed of the power generator 50a, in place of the torque converter 64 in the embodiment described above, a control device 80a of this modified example is provided with an inverter control section 86, in place of the torque converter control section 82 in the embodiment described above.

Figure 5:
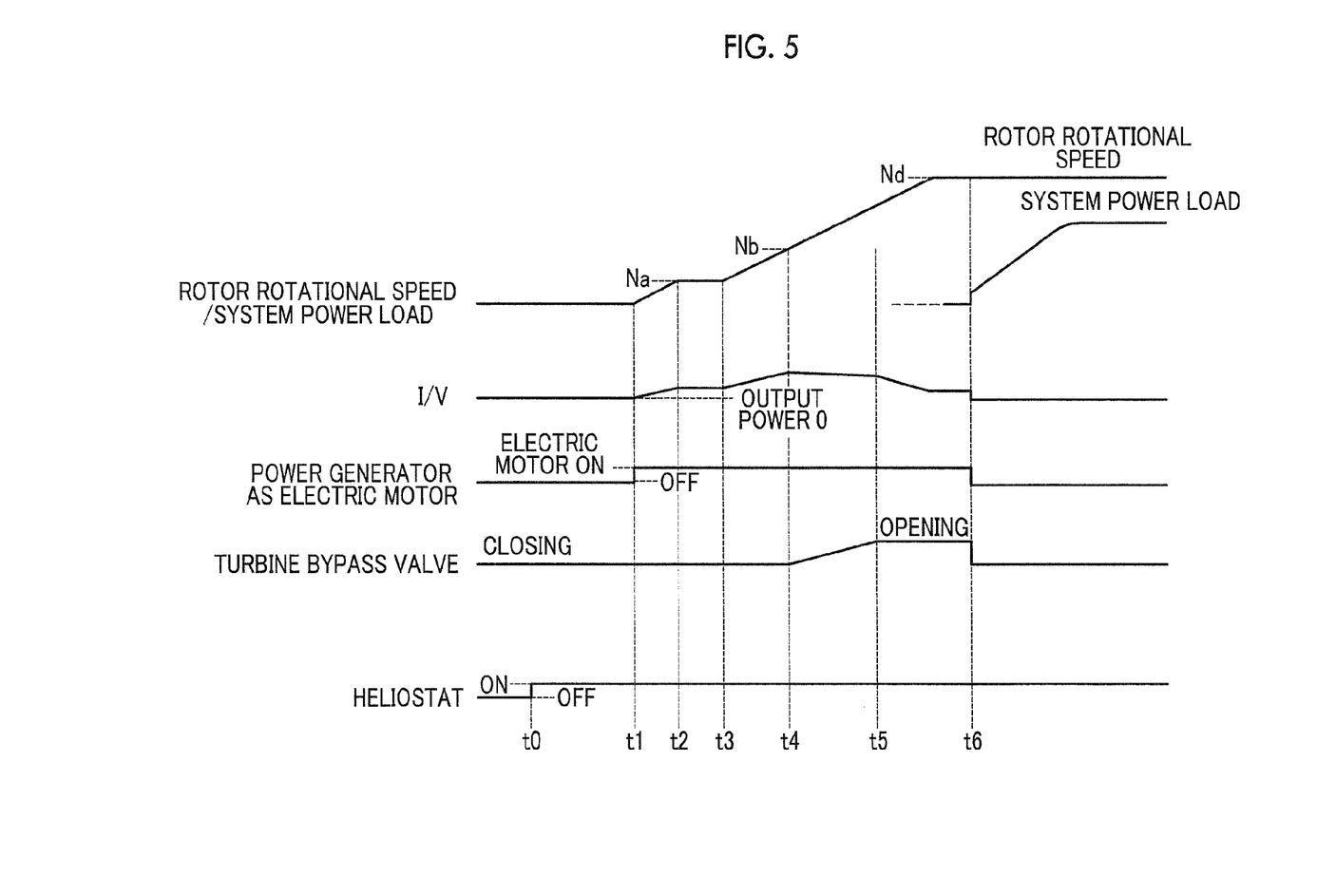
FIG. 5 is a time chart showing an operation of the solar thermal power generation facility in the second modified example of the embodiment related to the present invention.

Next, an operation at the time of start-up of the solar thermal power generation facility in this modified example will be described according to a timing chart shown in FIG. 5.

In this modified example, if the heliostat control section 84 outputs an irradiation ON command to the plurality of heliostats 40 (t0) and the temperature measured by the heat receiver outlet thermometer 38 or the heat receiving tube thermometer 39 reaches a predetermined temperature (for example, a temperature in a range of 200° C. to 300° C.) (t1), the breaker control section 83 outputs a closing command to the input-side breaker 58 and the output-side breaker 57 in response to an instruction from the integrated control section 81. As a result, system power begins to be supplied to the power generator 50a through the inverter 69, and thus the power generator 50a begins to be driven as an electric motor. Further, at the same time, the inverter control section 86 starts the control of the inverter 69, for example.

The inverter control section 86 outputs a control command which includes a target rotational speed or a value corresponding thereto to the inverter 69 such that, for example, the power generator 50a as an electric motor reaches the target rotor rotational speed which is represented by a predetermined rotational speed pattern. Specifically, the rotational speed pattern determines a target rotor rotational speed at each time from the time of the start of start-up of the power generator 50a as an electric motor such that an increasing rate per unit time of the rotor rotational speed from the time of the start of start-up of the power generator 50a becomes a predetermined increasing rate. As a result, the rotor rotational speed that is the rotational speed of each of the power generator rotor 51, the compressor rotor 11, and the turbine rotor 21 gradually increases with time. In addition, the output power of the inverter 69 increases according to an increase in the rotational speed of the turbine 20, as shown in FIG. 5.

Here, if the rotor rotational speed reaches the predetermined rotational speed Na (for example, a rotational speed in a range of 20% to 40% of the rated rotational speed Nd) (t2), similar to the embodiment described above, the rotor rotational speed is fixed by temporarily stopping the inverter control by the inverter control section 86, and waiting may be performed until the temperature measured by the heat receiver outlet thermometer 38 or the heat receiving tube thermometer 39 reaches a predetermined temperature (for example, a temperature in a range of 500° C. to 700° C.). Then, if the temperature measured by the heat receiver outlet thermometer 38 or the heat receiving tube thermometer 39 reaches the predetermined temperature (t3), the inverter control by the inverter control section 86 may be executed again.

If the rotor rotational speed gradually increases, whereby the rotor rotational speed measured by the rotational speed meter 19 becomes greater than or equal to the predetermined rotational speed Nb (for example, a rotational speed in a range of 40% to 60% of the rated rotational speed Nd) (t4), similar to the embodiment described above, the bypass valve control section 85 of the control device 80a outputs a valve opening degree command to the turbine bypass valve 75 in response to an instruction from the integrated control section 81. As a result, the turbine bypass valve 75 is opened, thereby reaching the instructed valve opening degree. As described above, since the heating amount to the compressed air in the heat receiver 30 increases with time and a force to rotate the turbine rotor 21 by the compressed air increases, the turbine bypass valve 75 is opened, whereby the flow rate of the heated compressed air which is sent to the turbine 20 is reduced.

At this time, the bypass valve control section 85 determines the valve opening degree of the turbine bypass valve 75 such that, for example, the valve opening degree of the turbine bypass valve 75 becomes a target valve opening degree which is represented by a predetermined valve opening degree pattern. Specifically, with respect to the valve opening degree pattern, for example, in a valve opening degree from a valve opening degree of 0 to predetermined valve opening degree, an increasing rate of the valve opening degree per unit time becomes a predetermined increasing rate, and thereafter, the valve opening degree becomes constant.

As described above, the torque component to rotate the turbine rotor 21 by the heated compressed air, among the torque components to rotate the turbine rotor 21, increases relative to the torque component to rotate the turbine rotor 21 by the power generator 50a, with time. For this reason, although the rotational speed control of the power generator rotor 51 by the inverter 69 is executed, the output power which is sent from the inverter 69 to the power generator 50a has a tendency to decrease with a certain point in time as a boundary.

In this modified example, even after the rotor rotational speed reaches the rated rotational speed Nd (t5), the rotational speed control of the power generator rotor 51 by the inverter 69 is continued. This is because, in this modified example, the adjustment of the valve opening degree of the turbine bypass valve 75 is not intended for the rotor rotational speed control, unlike the embodiment described above.

If a predetermined time elapses (t6) after the rotor rotational speed reaches the rated rotational speed Nd (t5), the breaker control section 83 outputs an opening command to the input-side breaker 58 or the output-side breaker 57 and also outputs a closing command to the power generator breaker 55, in response to an instruction from the integrated control section 81. As a result, system power is not supplied to the power generator 50a through the inverter 69, and thus the power generator 50a does not function as an electric motor. In addition, at this time, the electric power system S and the power generator 50a are electrically connected. That is, the power generator 50a is incorporated into the electric power system S and the power supply from the power generator 50a to the electric power system S is started.

If the power generator 50a is incorporated into the electric power system S, load is rapidly applied to the power generator 50a, whereby the rotational speed of the power generator rotor 51 or the turbine rotor 21 is rapidly reduced. Therefore, also in this modified example, a configuration is made such that at the same time as the incorporation of the power generator 50a, the turbine bypass valve 75 is instantaneously fully closed, whereby the compressed air exhausted from the exhaust air duct 28 by way of the turbine bypass piping 74 without being sent to the turbine 20, of the compressed air sent from the compressor 10, is sent to the turbine 20, and thus the rotational speed of the power generator rotor 51 or the turbine rotor 21 is maintained as the rated rotational speed Nd.

Thereafter, the turbine 20 is basically controlled by adjusting the number of heliostats 40 irradiating the sunlight to the heat receiver 30, similar to the embodiment described above.

As described above, also in this modified example, it is possible to suitably control the rotational torque of the turbine rotor 21 at the time of start-up.

In addition, also in this modified example, a configuration may be made such that in place of the turbine bypass valve 75, the heat receiver bypass valve 77 or the blow-off valve 79 is provided, as illustrated in the first modified example, and the rotational torque of the turbine rotor 21 at the time of start-up is controlled by the heat receiver bypass valve 77 or the blow-off valve 79.

Further, in the embodiment described above and this modified example, if the power generator 50 or 50a is incorporated into the electric power system S, the turbine bypass valve 75 is instantaneously fully closed. However, as long as the valve opening degree of the turbine bypass valve 75 is instantaneously reduced at the time of the incorporation of the power generator 50 or 50a, whereby the flow rate of the compressed air flowing through the turbine bypass piping 74 is instantaneously reduced, the full closing may not be performed.

Further, in the embodiment described above and each modified example described above, the reheater 25 is provided on the exhaust side of the turbine 20. However, the reheater 25 is not essential in the solar thermal power generation facility.

INDUSTRIAL APPLICABILITY

According to the solar thermal power generation facility, it is possible to suitably control the rotational torque of the turbine rotor at the time of start-up.

REFERENCE SIGNS LIST

10: compressor
11: compressor rotor
20: turbine
21: turbine rotor
25: reheater
28: exhaust air duct
30: heat receiver
40: heliostat
50, 50a: power generator
60, 60a: start-up device
61: electric motor
64: torque converter
69: inverter
71: compressed air piping
72: reheated air piping
73: heated air piping
74: turbine bypass piping
75: turbine bypass valve
76: heat receiver bypass piping
77: heat receiver bypass valve
78: blow-off piping
79: blow-off valve
80, 80a: control device
81: integrated control section
82: torque converter control section
83: breaker control section
84: heliostat control section
85: bypass valve control section
86: inverter control section

The invention claimed is:

1. A solar thermal power generation facility comprising:
a compressor which compresses a working medium, thereby producing a compressed medium;
a heat receiver which receives sunlight, thereby heating the compressed medium;
a turbine in which a turbine rotor is rotated by the compressed medium heated in the heat receiver;
a power generator which generales electricity by rotation of the turbine rotor;
a start-up device which rotates the turbine rotor at a time of start-up;
bypass means for making at least a portion of the compressed medium from the compressor bypass the turbine or the heat receiver; and
a control device which controls rotational torque of the turbine rotor by making the compressed medium bypass the turbine or the heat receiver by the bypass means before a rotor rotational speed reaches a rated rotational speed in a speeding-up process of the rotor rotational speed by the start-up device and adjusting a flow rate of the compressed medium which is made to bypass the turbine or the heat receiver,
wherein the control device makes the compressed medium not bypass the turbine or the heat receiver by the bypass means before the rotor rotational speed reaches a predetermined rotor rotational speed that is lower than the rated rotational speed in the speeding-up process, and makes the compressed medium bypass the turbine or the heat receiver after the rotor rotational speed reaches the predetermined rotor rotational speed, and
wherein the control device instantaneously reduces the flow rate of the compressed medium which is made to bypass the turbine or the heat receiver by the bypass means, at a time of incorporation in which the power generator is connected to an electric power system after the rotor rotational speed reaches the rated rotational speed.

2. The solar thermal power generation facility according to claim 1, wherein the control device makes the flow rate of the compressed medium which is made to bypass the turbine or the heat receiver by the bypass means be 0 at the time of the incorporation.

3. The solar thermal power generation facility according to claim 1, wherein the bypass means has a bypass flow rate adjustment valve which adjusts the flow rate of the compressed medium which is made to bypass the turbine or the heat receiver, and
   the control device makes a valve opening degree of the bypass flow rate adjustment valve be fully closed at the time of the incorporation.

4. The solar thermal power generation facility according to claim 1, wherein the control device adjusts the flow rate of the compressed medium which is made to bypass the turbine or the heat receiver by the bypass means such that an actual rotor rotational speed approaches a predetermined rotor rotational speed pattern at the time of start-up until just before the incorporation.

5. The solar thermal power generation facility according to claim 4, wherein the control device stops assistance for rotation of the turbine rotor by the start-up device before the time of the incorporation.

6. The solar thermal power generation facility according to claim 1, wherein the start-up device has an electric motor which rotates the turbine rotor at the time of start-up, and a torque ratio conversion mechanism which changes the ratio of torque that is transmitted from an input shaft to an output shaft,
   the input shaft of the torque ratio conversion mechanism is connected to an output shaft of the electric motor,
   the output shaft of the torque ratio conversion mechanism is connected to the turbine rotor, and
   the control device outputs a control command corresponding to a target value of the torque ratio according to the lapse of time to the torque ratio conversion mechanism at the time of start-up, thereby increasing rotational torque which is transmitted from the start-up device to the turbine rotor, and thus speeding up the rotor rotational speed.

7. The solar thermal power generation facility according to claim 1, wherein the start-up device has the power generator which functions as an electric motor that rotates the turbine rotor at the time of start-up, and a rotational speed conversion mechanism which changes a rotational speed of the power generator by controlling electric power that is supplied to the power generator, and
   the control device outputs a control command according to a target value of the rotational speed of the power generator according to the lapse of time to the rotational speed conversion mechanism at the time of start-up, thereby speeding up the rotor rotational speed by the start-up device.

8. The solar thermal power generation facility according to claim 1, wherein the bypass means makes the compressed medium bypass the turbine or the heat receiver on the further upstream side with respect to the heat receiver.

9. The solar thermal power generation facility according to claim 1, wherein the bypass means has turbine bypass piping which leads at least a portion of the compressed medium compressed in the compressor from the further upstream side with respect to the turbine to an exhaust side of the turbine, and a turbine bypass valve which adjusts the flow rate of the compressed medium flowing through the turbine bypass piping, and
   the control device adjusts a valve opening degree of the turbine bypass valve.

10. The solar thermal power generation facility according to claim 1, wherein the bypass means has heat receiver bypass piping which makes at least a portion of the compressed medium compressed in the compressor bypass the heat receiver from the further upstream side with respect to the heat receiver, thereby leading the compressed medium to the further downstream side with respect to the heat receiver and to the further upstream side with respect to the turbine, and a heat receiver bypass valve which adjusts the flow rate of the compressed medium flowing through the heat receiver bypass piping, and
    the control device adjusts a valve opening degree of the heat receiver bypass valve.

11. The solar thermal power generation facility according to claim 1, wherein the bypass means has blow-off piping which releases at least a portion of the compressed medium compressed in the compressor from the further upstream side with respect to the heat receiver to the atmosphere, and a blow-off valve which adjusts the flow rate of the compressed medium flowing out from the blow-off piping to the atmosphere, and
    the control device adjusts a valve opening degree of the blow-off valve.

12. A method of starting up a solar thermal power generation facility that includes a compressor which compresses a working medium, thereby producing a compressed medium, a heat receiver which receives sunlight, thereby heating the compressed medium, a turbine in which a turbine rotor is rotated by the compressed medium heated in the heat receiver, a power generator which generates electricity by rotation of the turbine rotor, and a start-up device which rotates the turbine rotor at a time of start-up, the method comprising:
    a speeding-up process of speeding up a rotational speed of the turbine rotor in the start-up device;
    an incorporation procedure control process of controlling rotational torque of the turbine rotor until a time of incorporation in which the power generator is connected to an electric power system, by making at least a portion of the compressed medium from the compressor bypass the turbine or the heat receiver before the rotational speed of the turbine rotor reaches a rated rotational speed in the speeding-up process and adjusting a flow rate of the compressed medium which is made to bypass the turbine or the heat receiver; and
    a process of making the compressed medium not bypass the turbine or the heat receiver before the rotor rotational speed reaches a predetermined rotor rotational speed that is lower than the rated rotational speed in the speeding-up process,
    wherein the incorporation procedure control process is carried out after the rotor rotational speed reaches the predetermined rotor rotational speed in the speeding-up process, and
    wherein in the incorporation procedure control process, the flow rate of the compressed medium which is made to bypass the turbine or the heat receiver is instantaneously reduced at the time of the incorporation.

13. The method of starting up a solar thermal power generation facility according to claim 12, wherein in the incorporation procedure control process, the flow rate of the compressed medium which is made to bypass the turbine or the heat receiver is made to be 0 at the time of the incorporation.

* * * * *